United States Patent [19]

Liu et al.

[11] 4,426,706
[45] Jan. 17, 1984

[54] MOLECULAR EXCIMER GAS UV PREIONIZED TRANSVERSE DISCHARGE LASER TUBE ASSEMBLY

[75] Inventors: Chi S. Liu, Monroeville; Roy K. Williams, Murrysville; Lee R. Jasper, Irwin; Norman A. Hensler, Pittsburgh, all of Pa.

[73] Assignee: The United States of America as represented by the Secretary of the Navy, Washington, D.C.

[21] Appl. No.: 331,109

[22] Filed: Dec. 16, 1981

[51] Int. Cl.³ .............................................. H01S 3/097
[52] U.S. Cl. ........................................ 372/86; 372/57; 372/87
[58] Field of Search ........................ 372/86, 57, 87, 33

[56] References Cited

U.S. PATENT DOCUMENTS

| 4,229,711 | 10/1980 | Schimitschek et al. | 331/94.5 P |
| 4,237,430 | 12/1980 | Liu et al. | 331/94.5 D |
| 4,262,267 | 4/1981 | Schimitschek et al. | 331/94.5 G |

Primary Examiner—James W. Davie
Attorney, Agent, or Firm—Robert F. Beers; Arthur A. McGill; Prithvi C. Lall

[57] ABSTRACT

The disclosed molecular excimer laser discharge tube employs a transverse electrical discharge with a UV preionization. The discharge tube is made of pure quartz with two optical quality windows fused onto the two ends. The mechanical support and electrical feedthrough for the profiled molybdenum cathodes are provided by commercially available quartz molybdenum cup seals. The anode is made of perforated molybdenum sheet and is supported by slots formed in quartz plates. The preionization for the main discharge is generated from "V" cuts provided in a molybdenum ribbon sealed in a quartz tube.

7 Claims, 4 Drawing Figures

MOLECULAR EXCIMER GAS UV PREIONIZED TRANSVERSE DISCHARGE LASER TUBE ASSEMBLY

This invention is drawn to the field of high gain, tunable lasers, and more particularly, to a high pressure, high temperature, molecular excimer gas UV preionized, transverse discharge laser tube assembly.

Metal halide excimer lasing media, such as $MX_2$, where M=(Hg, Cd, or Zn) and X=(Cl, Br, or I), produce visible and near infrared radiation which is especially attractive in advanced Navy underwater communication and countermeasure applications. The laser radiation is produced by quantum electronic transitions of excited excimer gas molecules whose ground state potential energy has a large Franck-Condon shift. Gain for these bound-bound transitions occurs because of the rapid deactivation of high vibrational levels of the ground state molecules which prevents the filling up of the lower laser level and the untimely termination of the inversion. Metal halide excimer lasers are thus potentially very efficient.

The principal limitations of the metal halide excimer lasers are associated with materials selection for the discharge tube assembly and with the employed excitation technologies. Discharge tube assembly components often fail due to corrosion from halide attack, and, in regard to the latter, an excitation technology must minimize lasing inefficiencies due to non-uniformly excited state densities.

Excimer lasing has been produced by intense excitation from photon pump excitation as shown in U.S. Pat. No. 4,262,267, issued Apr. 14, 1981 to Schimitschek et al, incorporated herein by reference, from longitudinal electrical excitation as shown in U.S. Pat. No. 4,237,430, issued Dec. 2, 1980 to Liu et al, some of the inventors of which are the present applicants, incorporated herein by reference, and from transverse electrical excitation as shown by U.S. Pat. No. 4,262,267, issued Apr. 14, 1981 to Schimitschek et al, incorporated herein by reference. The discharge tube assembly according to the last named patent comprises a pair of spaced solid-tungsten rod electrodes positioned within a PYREX glass tube and a preionizer assembly disposed between the electrodes comprising one of a tungsten electrode providing a corona-type photoionization, a flashboard having multiple gaps between conductive segments, and multiple tungsten wires secured on a ceramic rod by sections of TEFLON tubing.

SUMMARY OF THE INVENTION

The corrosion resistant, uniformly excited UV preionized transverse discharge molecular excimer gas laser discharge tube assembly of the present invention, comprises a first quartz tube; a pair of quartz optical quality windows fused onto the ends of the first quartz tube at the Brewster angle forming an enclosure; a molecular excimer gas mixture disposed within the enclosure; a molybdenum cathode having a profiled contour; means including a molybdenum/quartz cup sealed to the first quartz tube for supporting the molybdenum cathode to one side of the longitudinal axis of the first quartz tube such that the longitudinal axis of the profiled molybdenum cathode is substantially parallel to the longitudinal axis of the first quartz tube and for providing an electrical connection to the profiled molybdenum cathode; a molybdenum screen anode; means for supporting the molybdenum screen anode to the other side of the longitudinal axis of the first quartz tube such that the longitudinal axis of the molybdenum screen anode is substantially parallel to the longitudinal axis of the first quartz tube and for providing an electrical connection to the molybdenum screen anode; and a preionizer assembly spaced between the molybdenum screen anode and the first quartz tube, the preionizer assembly comprising a molybdenum ribbon sealed within a second quartz tube, the second quartz tube sealed to the first quartz tube with the molybdenum ribbon extending therethrough, the second quartz tube having along an edge thereof a number of spaced "V" cut slots that extend partially through the wall of the second quartz tube so as to subdivide the molybdenum ribbon into a corresponding number of ribbon segments.

According to one feature of the present invention, component failure due to high temperature halide attack is substantially eliminated by fashioning the entire UV preionized transverse discharge laser tube assembly entirely from quartz and molybdenum. The disclosed discharge tube assembly is thus capable of efficient lasing operation within the 1100° C. limit of the quartz envelope utilizing straightforward glass blowing techniques. The disclosed discharge tube operates at a uniform temperature thereby eliminating excimer cold spot condensation and a completely sealed-off design provides for chemically equilibrated operation.

According to another feature of the present invention, uniformly excited state densities are accomplished by the combination of a high buffer gas pressure capability, on the order of 10 atmospheres, and by a uniform volumetric photoionization of the eximer laser media. The slotted quartz tube molybdenum ribbon preionizer assembly and screen molybdenum anode configuration provide a uniform glow discharge preventing the deleterious effects of arc formation.

Accordingly, it is an object of the present invention to provide a transverse discharge molecular excimer gas laser tube assembly.

It is another object of the present invention to provide such a laser discharge assembly that produces stimulated emission of metal halide excimer lasing media in the blue-green and near infrared spectrum.

It is another object of the present invention to provide such a laser discharge assembly that is resistant to component failure due to assembly corrosion.

It is another object of the present invention to provide such a discharge tube assembly that provides uniformly excited state densities for maximum lasing efficiency.

It is yet another object of the present invention to provide such a laser assembly that is chemically equilibrated and which is simple, rugged and of compact design for long life and durability.

Other objects, advantages and attendant features of the present invention will become apparent by referring to the appended claims, and to the following detailed description of the preferred embodiment, wherein like parts are similarly designated throughout, and wherein:

DETAILED DESCRIPTION OF THE PREFERRED EMBODIMENT

Figure 1A:
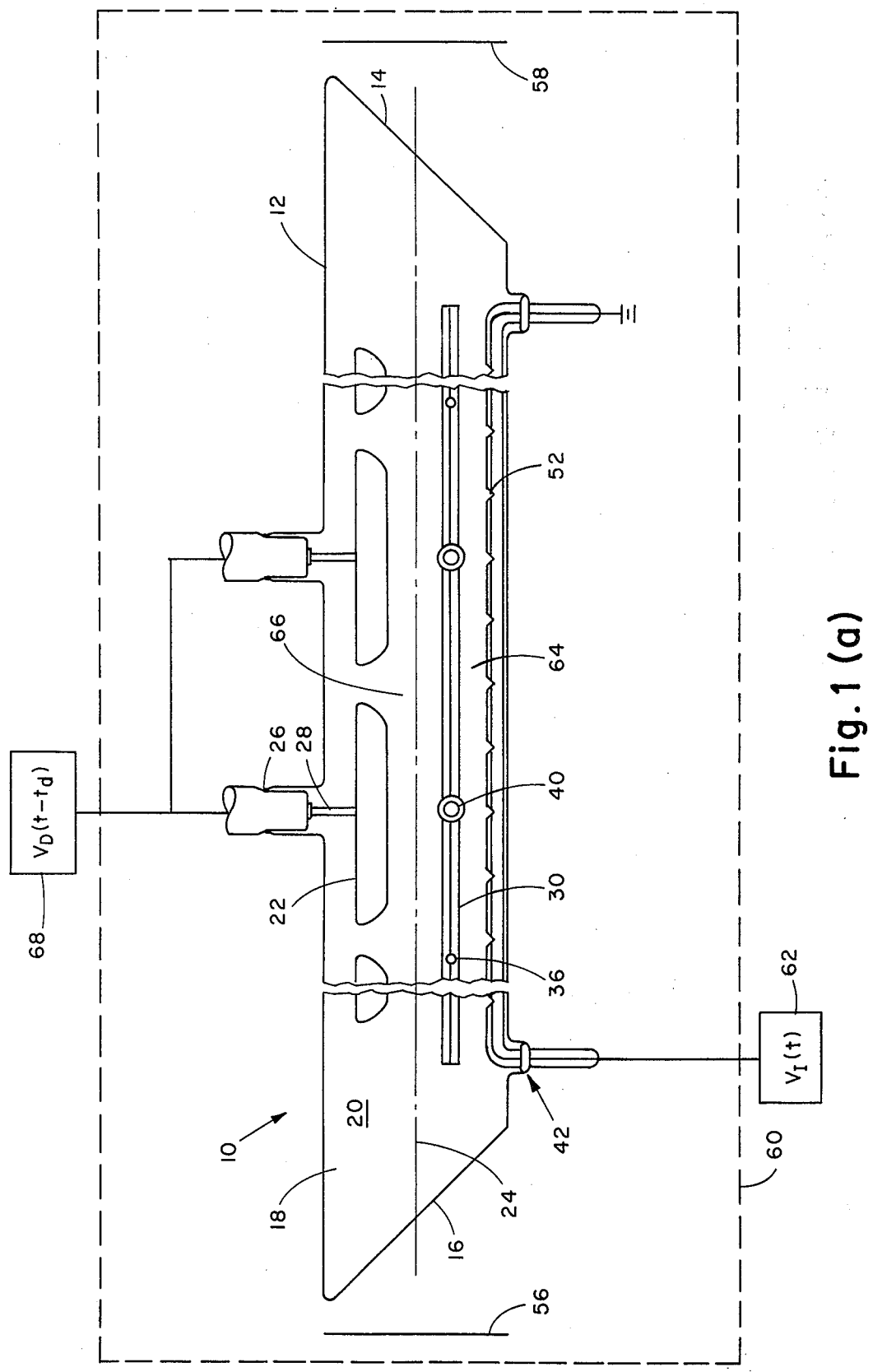
FIG. 1A is a side view of the excimer laser tube assembly of the present invention.
Figure 1B:
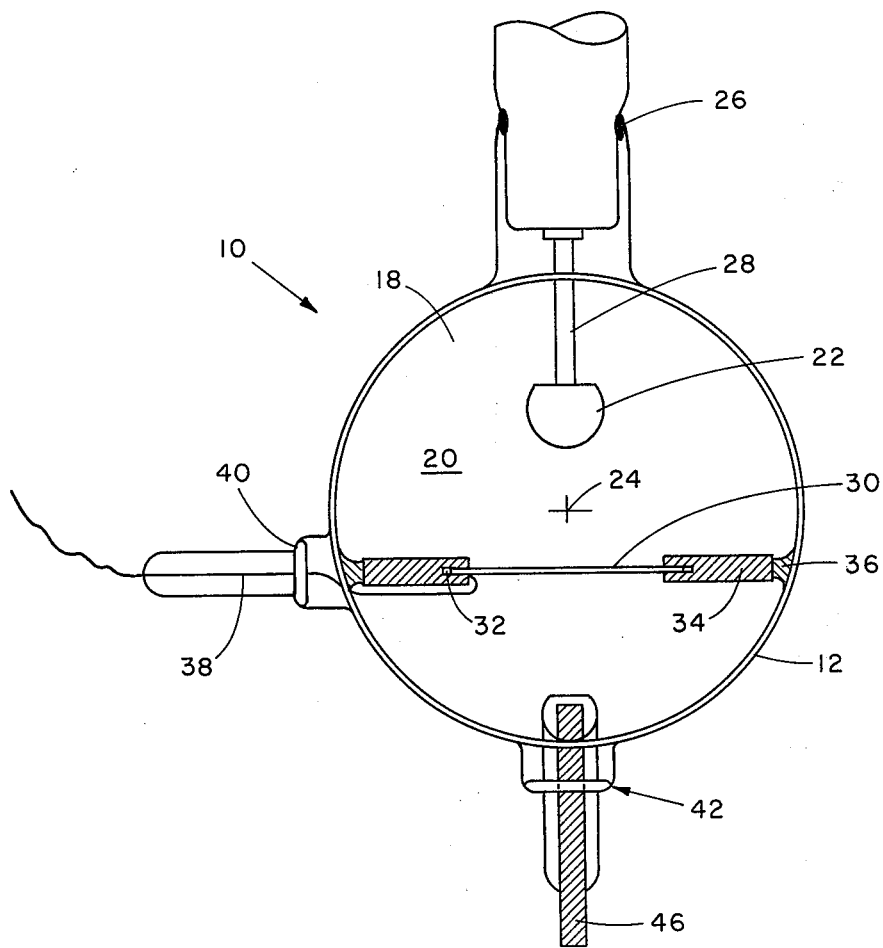
FIG. 1B is an end view of the excimer laser tube assembly of the present invention.

Referring now to FIGS. 1A and 1B, generally designated at 10 is the novel molecular excimer gas laser discharger tube assembly of the present invention. The assembly 10 includes a quartz tube member 12 having quartz optical quality windows 14 and 16 fused to the remote ends thereof at the Brewster angle forming an enclosure 18. A molecular gas laser excimer mixture 20 is disposed in the enclosure 18 which preferably comprises a metal halide excimer lasing media such as $MX_2$, where M=Hg, Cd, or Zn, and X=Cl, Br, or I, and a selected buffer gas such as neon.

A molybdenum cathode 22 having a Rogowski profile is positioned within the enclosure 18 to one side of the longitudinal axis 24 of the assembly 10 such that the longitudinal axis of the profiled molybdenum cathode 22 is substantially parallel to the longitudinal axis 24 of the assembly 10. The mechanical support for and the electrical connection onto the profiled cathode 22 is preferably provided by a quartz/molybdenum cup 26 sealed to the tube 12 and a molybdenum rod 28 which is threaded or otherwise joined to the quartz/molybdenum cup 26 and the profiled molybdenum cathode 22. It is noted that the quartz molybdenum cup 26 is commercially available from Bomco, Inc.

Figure 1C:
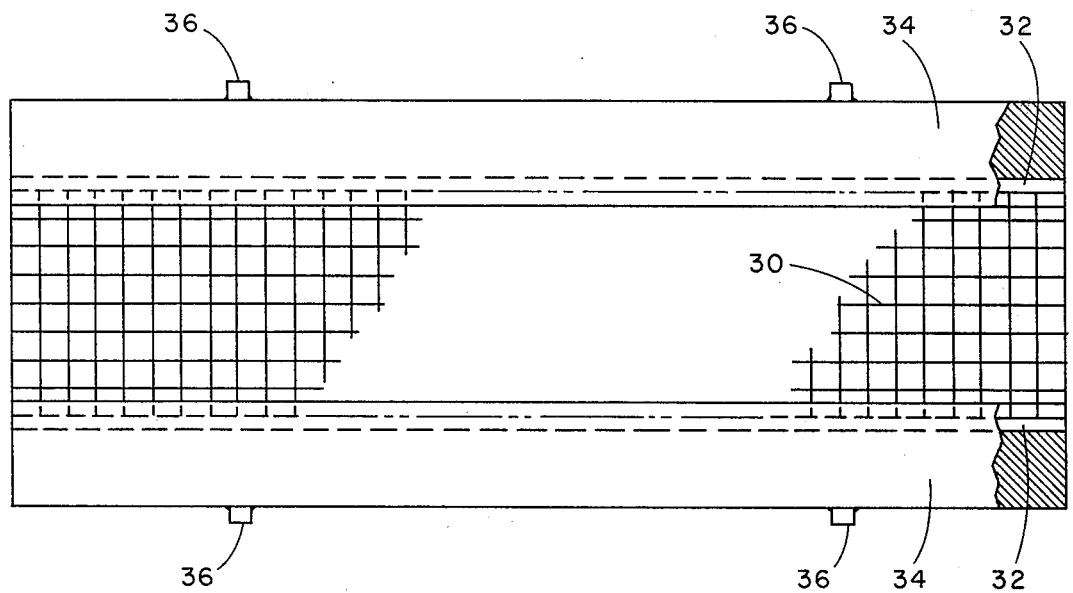
FIG. 1C is a top view of the screen anode support assembly of the present invention.

A molybdenum screen anode 30 is positioned within the enclosure 18 to the other side of the longitudinal axis 24 of the assembly 10 such that the longitudinal axis of the molybdenum anode is substantially parallel to the longitudinal axis 24 of the quartz tube 12. As can be seen by referring to FIGS. 1B and 1C, the molybdenum screen anode 30 is mechanically supported within the enclosure 18 in slots 32 formed in a quartz plate 34 which is sealed as by sealing lugs 36 to the quartz tube member 12. A molybdenum ribbon 38 is electrically connected to the molybdenum screen anode 30 and extends exteriorly of the quartz tube member 12 through a seal as shown at 40. It is noted that although the use of the slotted quartz plate anode support configuration is preferred for providing mechanical support and electrical connection to the molybdenum screen anode, other suitable means such as the use of quartz-/molybdenum cup seals may be utilized as well.

Figure 1D:
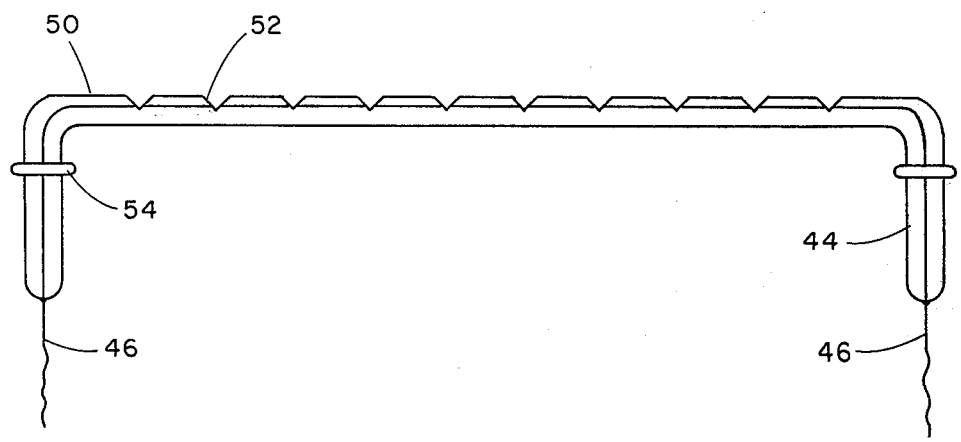
FIG. 1D is an enlarged side view of the preionizer assembly of the present invention.

A preionizer assembly generally designated at 42 is positioned within the enclosure 18 between the molybdenum screen anode 30 and the quartz tube member 12. As can be seen by referring to FIG. 1D, the preionizer assembly 42 preferably comprises a commercially available quartz tube 44 having a molybdenum ribbon 46 sealed therein. The inner edge 50 of the quartz tube 44 is ground down a distance selected to bring the molybdenum ribbon 46 close to the surface. A plurality of spaced "V" cut slots 52 are provided in the ground edge 50 which cut partially through the wall of quartz tube 44 in such a way as to form a corresponding plurality of ribbon segments from molybdenum ribbon 46. The preionizer 42 is sealed to the quartz tube member 12 as by ring seals 54 and the ends of molybdenum ribbon 46 extend exteriorly through the tube member 12.

A suitable reflector system comprising for example a pair of parallel mirrors 56 and 58 spaced on both ends of the longitudinal axis 24 provide the assembly 10 with an optically resonant cavity. The mirror 56 may, for example, be a totally reflecting mirror and the mirror 58 may, for example, be a partially reflecting mirror. It will be appreciated that other forms of reflector systems may be utilized as well and that the reflector system as such forms no part of the present invention.

The laser discharge tube assembly 10 of the present invention is operated in a suitable pressurized oven shown schematically at 60. The temperature of the oven is selected to be within the limit of the quartz envelope at a value sufficient to bring the preselected molecular gas mixture 20 from the solid to the vapor phase. The vapor pressure of the metal halide is selected to provide an excited state density sufficient to ensure population inversion in the preselected molecular gas laser media. It has been found that the novel assembly 10 of the present invention is capable of operation up to about 10 atmospheres of buffer gas pressure.

In the operation of the molecular gas excimer laser discharge tube 10 according to FIGS. 1A-1D of the present invention, an output pulse from a preionizer pulse generator 62 initiates a preliminary electrical discharge that propagates sequentially along the "V" cuts 52 of the preionizer assembly 42. This preliminary discharge generates at the cuts 52 ultraviolet photons which initially photoionize the molecular excimer gas mixture 20 in the region 64 between the preionizer 42 and the screen molybdenum anode 30. After a time delay ($t_d$) selected to enable the photons to penetrate through the screen molybdenum anode 30 for volumetrically photoionizing the region 66 to a desired level, a discharge pulse generator 68 applies output pulses to the profiled molybdenum cathode 22 causing electron emission therefrom. A main electrical discharge is thus established transverse to the longitudinal axis 24 which, it has been found, efficiently excites the molecular excimer gas laser media 20 to a lasing condition thereby producing light pulses along the axis 24 of the assembly 10.

The all quartz/molybdenum UV preionized, transverse discharge molecular excimer gas laser tube assembly 10 of the present invention is corrosion resistant to high pressure and temperature halide attack thus providing for long life operation. It has been found that the slotted quartz tube/molybdenum ribbon preionizer and screen molybdenum anode assembly provide a uniform glow discharge, thus avoiding the deleterious effects of arc formation, which in combination with the high pressure and temperature capability of the disclosed tube design, cooperates to provide a uniformly excited population density sufficient to insure maximum molecular excimer gas lasing efficiency.

What is claimed is:

1. A corrosion resistant uniformly excited UV preionized transverse discharge molecular excimer gas laser tube assembly, comprising:
   a first quartz tube;
   a pair of quartz optical-quality windows sealed one at each end to said quartz tube at the Brewster angle forming an enclosure;
   a molecular excimer laser gas mixture disposed within said enclosure;
   a molybdenum cathode;
   means including a quartz/molybdenum cup sealed to the first quartz tube for mechanically supporting said molybdenum cathode within said enclosure such that the longitudinal axis of said molybdenum cathode is to one side of and substantially parallel to the longitudinal axis of said first quartz tube and for providing an electrical connection to said molybdenum cathode;

a molybdenum anode;

means for supporting said molybdenum anode within said enclosure such that the longitudinal axis of said molybdenum anode is to the other side of and substantially parallel to the longitudinal axis of said first quartz tube and for providing an electrical connection to said molybdenum anode; and a preionizer assembly disposed within said enclosure, said preionizer assembly comprising a molybdenum ribbon sealed in a second quartz tube and having along an edge thereof a plurality of spaced "V" cut slots therealong, said "V" cut slots extending partially through the wall of said second quartz tube in such a way as to form a corresponding plurality of molybdenum ribbon segments therein.

2. A corrosion resistant uniformly excited UV preionized transverse discharge molecular excimer gas laser tube assembly, as recited in claim 1, wherein said molybdenum cathode has a profiled contour.

3. A corrosion resistant uniformly excited UV preionized transverse discharge molecular excimer gas laser tube assembly, as recited in claim 1, wherein said molybdenum anode is a screen molybdenum anode.

4. A corrosion resistant uniformly excited UV preionized transverse discharge molecular excimer gas laser tube assembly, as recited in claims 2 or 3, wherein said molecular gas mixture is a metal excimer gas mixture.

5. A corrosion resistant uniformly excited UV preionized transverse discharge molecular excimer gas laser tube assembly, as recited in claim 4, wherein said metal excimer laser gas mixture is a metal halide selected from the $MX_2$ group, wherein $M=$(Hg, Cd, or Zn) and $X=$(Cl, Br, or I).

6. A corrosion resistant uniformly excited UV preionized transverse discharge molecular excimer gas laser tube assembly, as recited in claim 3, wherein said anode support means includes a pair of quartz plates having slots adapted to receive said screened molybdenum anode.

7. A corrosion resistant uniformly excited UV preionized transverse discharge molecular excimer gas laser tube assembly, as recited in claim 6, wherein said preionizer assembly is disposed between said molybdenum screen anode and said first quartz tube.

* * * * *